April 13, 1965

C. L. HALL ETAL 3,177,540

PLASTIC PANEL FASTENER

Filed May 31, 1962

Inventors:
Charles L. Hall &
Charles H. Becker,
by Walter S. Jones
Atty.

United States Patent Office 3,177,540
Patented Apr. 13, 1965

3,177,540
PLASTIC PANEL FASTENER
Charles L. Hall, Detroit, Mich., and Charles H. Becker, Braintree, Mass., assignors to United-Carr Incorporated, Boston, Mass., a corporation of Delaware
Filed May 31, 1962, Ser. No. 198,777
3 Claims. (Cl. 24—73)

This invention relates to snap fastener stud members of unique construction adapted to be used for assembling two or more parts.

An object of the invention is to provide simple, inexpensive snap fastener studs, of novel construction, and each having a base portion of any suitable construction and configuration, a snap-in shank extending from the base portion, the shank having two or more fins which co-operate to provide an aperture entering portion, an enlarged holding portion and a neck portion.

A further object of the invention is to form an improved stud member as a one-piece molded member of any suitable moldable material to provide the desired snap action and holding features.

Another object of the invention is to provide a shank portion of the stud member with a plurality of generally radially arranged fins in various combinations and shapes together providing the co-operation to produce the desired results.

In the drawings which illustrate three embodiments of the invention:

Figure 1:
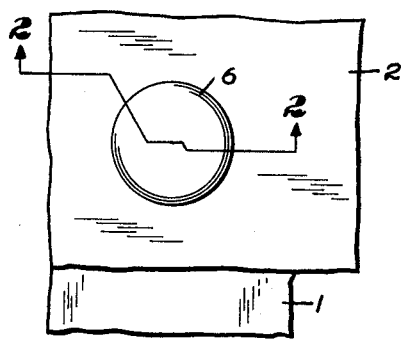
FIG. 1 is a plan view of a portion of an installation showing a stud holding together two members.

Referring to the particular embodiments of the invention shown in FIGS. 1-5 of the drawings there is illustrated (FIGS. 1 and 2) an installation which includes two plate-like members 1 and 2 having apertures 3 and 4 and held together by a novel snap fastener stud member 5.

The stud member 5 is preferably formed from a single piece of yieldable molded plastic material and has a base portion 6 (herein shown as a circular button shape) which may be of any suitable configuration. From the underside of the base portion 6 there extends a shank portion illustrated as being formed by three fins 7 joined together at a common place axially and extending generally radially from the common axis as clearly shown in FIGS. 3, 4 and 5. The fins may be two or more in number and in this particular embodiment are shown as being in curved planes so that they may flex toward each other when the fastener member is snapped through the apertures 3 and 4 in the members 1 and 2. The outer edges of the fins 7 are shaped and arranged to provide a tapered aperture entering portion 8 at the outer end of the shank, an enlarged holding portion 9 and a support engaging neck portion 10 as clearly shown in FIG. 2.

Figure 7:
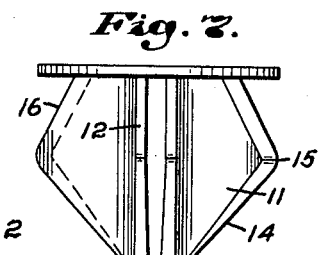
FIG. 7 is a side view of the fastening stud member per se shown in FIG. 6.
Figure 8:
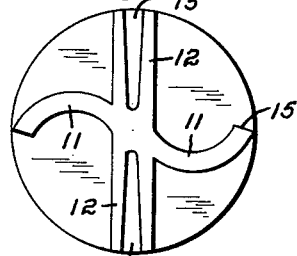
FIG. 8 is an end view of the stud member shown in FIG. 7 as viewed from the aperture entering end.

The second form of the invention shown in FIGS. 6, 7, and 8 discloses a stud member similar to the one described in connection with FIGS. 1-5 except that the fin arrangement and construction are different. In this fastener stud the shank is shown as being formed with two radially curved plane fins 11—11 and two radial flat plane fins 12—12. In this case the fins 11—11 are the same shape as the fins 7 of the first described construction but the fins 12—12 are in flat planes and divided by slots 13—13 to provide two relatively closely arranged longitudinal portions the reason for which will be more fully described hereafter. It should also be noted that the stud shank fins shown in FIGS. 6, 7, and 8 have co-operating edges to provide the tapered aperture entering portion 14, an enlarged portion 15, and a neck portion 16.

Figure 9:
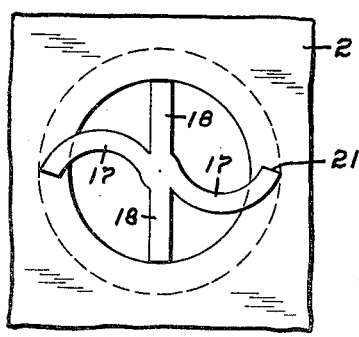
FIG. 9 is a view similar to FIG. 6 showing a third construction of a snap fastener stud member.
Figure 10:
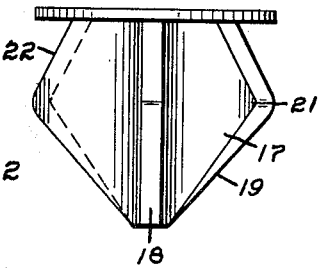
FIG. 10 is a side view of the stud member shown in FIG. 9.
Figure 11:
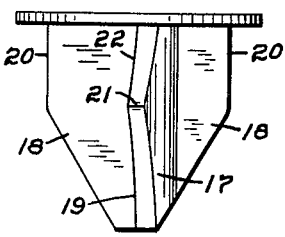
FIG. 11 is a side view of the stud member shown in FIG. 10 as viewed from the right hand side thereof.

Referring now to the snap fastener construction shown in FIGS. 9, 10, and 11 it will be noted that there are two fins 17—17 in curved planes substantially similar to those described in connection with the first and second constructions. In this case there are also provided two flat plane fins 18—18, but in this construction the outer edges are tapered to co-operate with the tapered portions of the fins 17—17 to provide the aperture entering tapered portion 19. However, the remaining portions of the edges 20—20 (FIG. 11) are parallel to the axis of the shank and spaced apart about the distance of the diameter of the apertures in the members 1 and 2 so that only the fins 17—17 provide the enlarged holding portion 21. The straight edge portions 20—20 of the flat plane fins 18—18 co-operate with the neck portion 22, provided by the curved fin portions 17—17, to centralize the shank in the apertures of the members 1 and 2.

The reason for illustrating and describing various forms of fins is to inform anyone skilled in the art that these constructions, and others within the scope of the invention, provide stud members which have various holding powers. For instance, the type of construction first illustrated and described may be used when a relatively light snap action and holding power are required, whereas the construction shown in the second described and illustrated construction may provide a very strong holding power and the third illustrated and described construction may provide a more balanced construction, the action of which may be varied as required.

Figure 6:
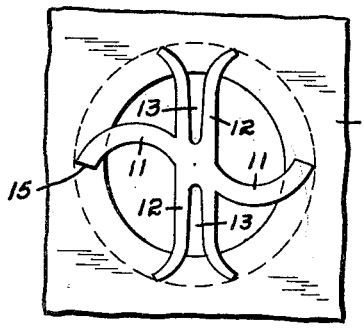
FIG. 6 is an underneath plan view of an installation similar to FIG. 1 showing a second form of snap fastener stud member construction.

It should also be understood that the devices showing the divided flat plane fins actually give more holding power, particularly when the divided portions of the fins turn away from each other, as shown in FIG. 6. This spreading of the fins 12—12, during the installation of the fastener, normally results in an arrangement as shown in FIG. 6. Under some circumstances the two portions of the fins 12—12 may twist in the same direction or in opposite directions, as shown in FIG. 6, depending on how the material reacts as the fastener is snapped through the apertures in the members 1 and 2.

Attention is also directed to the fact that a simpler mold construction is required to produce the second and third devices than the first device because of the constructions and arrangement of the fins. In other words, the constructions two and three may be produced by regular molding methods employing two opposed mold elements, whereas construction one would be difficult to mold except by the use of a so-called cam-operated type mold, as will be understood by anyone skilled in the molding art.

Figure 2:
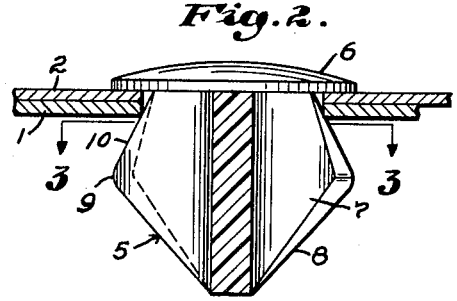
FIG. 2 is a section taken on the line 2—2 of FIG. 1, the stud member being partly in section.
Figure 3:
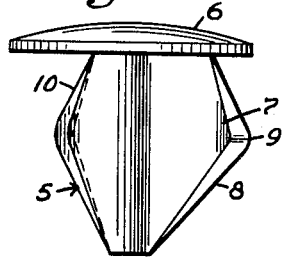
FIG. 3 is a section taken on the line 3—3 of FIG. 2.
Figure 4:
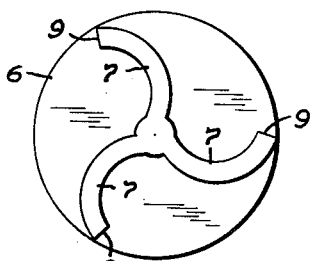
FIG. 4 is a side elevation of one form of snap fastener stud member.
Figure 5:
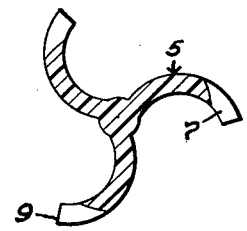
FIG. 5 is a plan view of the stud member shown in FIG. 4 as viewed from the aperture entering end of the stud.

When any of the constructions illustrated and described are used to hold together two or more members the tapered entering portion first passes into the aperture or apertures and then as pressure continues on the shank the twisted fins of any of the constructions will twist toward each other thereby readily to contract the enlarged holding portion so that it may pass through the aperture or apertures. Thereafter, the twisted fins expand again so that the neck of the shank adapts itself to the members 1 and 2 to be engaged so that those members are held between the neck and the base of the fastener member as shown in FIG. 2. Thus, it will be seen that each fastener adjusts itself to proper holding of the members 1 and 2 within various limits of thickness of those members.

During the fastener assembly operation the longitudinally divided flat plane fins 12—12 of the second described construction normally tend to spread away from each other, as shown in FIG. 6, thereby providing a strong holding fastener.

The flat plane fins shown in the third construction merely help to guide the shank into place and centralize the shank relative to the apertures 3 and 4.

While there has been illustrated and described several embodiments of the invention it should be understood that the invention is best defined by the following claims.

We claim:
1. A snap fastener stud member having a base portion and a shank portion extending from said base portion, said shank portion having a plurality of generally radially arranged flexible, easily twistable, thin fins having outer edges shaped and arranged together to provide an aperture entering tapered portion, at least one of said fins being divided lengthwise into two relatively closely arranged independently flexible portions, a yieldable enlarged holding portion and a support engaging neck between the enlarged holding portion and the base portion.

2. A snap fastener stud member of the class illustrated and described formed from a single piece of yieldable molded plastic material, said stud member having a base portion and a shank portion, the shank portion provided with a plurality of flexible fins together shaped to provide an aperture entering portion, a yieldable enlarged holding portion and a neck portion, at least one of said fins being curved in cross section on a plane taken at right angles to the axis of said shank portion and another of said fins lying on a flat plane lengthwise of the shank portion and said neck portion lying between said base portion and said enlarged portion of said ribs.

3. A unitary plastic snap fastener stud member having a base portion and a shank extending from said base portion, said shank portion having an axial shank and a plurality of radially arranged flexible, easily twistable, thin fins having outer edges shaped and arranged together to provide an aperture entering tapered portion, a yieldable enlarged holding portion and a support engaging neck between the enlarged holding portion and the base portion, at least one of said fins being curved to provide an arcuate cross section, radially from said shank, in a plane at right angles to the right axis of said shank and said fin having a width greater, at said cross section, at its widest dimension, than the diameter of said shank.

References Cited by the Examiner

UNITED STATES PATENTS

| | | |
|---|---|---|
| 617,064 | 1/99 | Traun. |
| 1,175,156 | 3/16 | Leali. |
| 1,897,335 | 2/33 | Riedel et al. |
| 1,952,471 | 3/34 | Stern et al. |
| 1,986,097 | 1/35 | Arey _____ 88—79 |
| 2,067,039 | 1/37 | Auer. |

FOREIGN PATENTS

| | | |
|---|---|---|
| 632,855 | 7/36 | Germany. |
| 1,061,889 | 12/53 | France. |
| 1,100,083 | 3/55 | France. |

DONLEY J. STOCKING, *Primary Examiner.*

ABRAHAM G. STONE, *Examiner.*